United States Patent [19]
Kerby et al.

[11] Patent Number: 5,868,573
[45] Date of Patent: Feb. 9, 1999

[54] VEHICLE CONTROL SIMULATOR

[76] Inventors: Robert Anthony Kerby, 38 Titsey Road, Surrey, Great Britain, RH8 0DF; Roger Graham Ball, 15 West Farm Avenue Ashtead, Surrey, Great Britain, KT21 2LD

[21] Appl. No.: 793,209
[22] PCT Filed: Aug. 15, 1995
[86] PCT No.: PCT/GB95/01924
  § 371 Date: Feb. 14, 1997
  § 102(e) Date: Feb. 14, 1997
[87] PCT Pub. No.: WO96/05585
  PCT Pub. Date: Feb. 22, 1996

[30] Foreign Application Priority Data

Aug. 15, 1994 [GB] United Kingdom ............... 94 16440.7
Aug. 15, 1994 [GB] United Kingdom ............... 94 16441.5

[51] Int. Cl.⁶ .................................................. G09B 9/00
[52] U.S. Cl. .............................................. 434/29; 434/62
[58] Field of Search ................................ 434/29–36, 32, 434/33, 45, 61–65, 71

[56] References Cited

U.S. PATENT DOCUMENTS

| | | |
|---|---|---|
| 3,740,870 | 6/1973 | Acker et al. . |
| 4,659,313 | 4/1987 | Kuster et al. . |
| 4,713,007 | 12/1987 | Alban . |
| 4,949,119 | 8/1990 | Moncrief et al. ........................ 434/71 |
| 5,272,932 | 12/1993 | Koyamatsu et al. . |
| 5,277,584 | 1/1994 | Degroat et al. . |
| 5,607,308 | 3/1997 | Copperman et al. ..................... 434/29 |

FOREIGN PATENT DOCUMENTS

| | | |
|---|---|---|
| 0112228 | 6/1984 | European Pat. Off. . |
| 2550505 | 2/1985 | France . |
| 9216921 | 10/1992 | WIPO . |
| 9216922 | 10/1992 | WIPO . |

*Primary Examiner*—Glenn Richman
*Attorney, Agent, or Firm*—Bartlett & Sherer

[57] ABSTRACT

A computer simulator for vehicles such as racing cars in which there is a steering mechanism which has an elastomeric flexible coupling (10) between the steering wheel (1) and the computer control mechanism which controls the action of the simulated vehicle on a video display unit so that the steering wheel has the feel of the actual vehicle, preferably there are gear change levers (16) forming part of the steering wheel (1) and foot pedals (22) and sound simulators which are interactive with the computer to enhance the simulation.

15 Claims, 4 Drawing Sheets

VEHICLE CONTROL SIMULATOR

This invention relates to controllers for computer games or computerised vehicle simulated activities, more particularly, to controllers for computer games which are more realistic in their operation.

In computer games which simulate high speed or racing cars, a picture of a race track or road appears on a video display or monitor screen and operation from the controller can affect the speed, steering and behaviour of a vehicle driving down the track or road—simulating this effect on the screen. Therefore, if the game's controls can feel like the controls of a real vehicle, the more realistic the games can appear to be.

We have now invented a more realistic controller for use in computer games simulating these vehicle controls.

According to the invention there is provided a simulated steering mechanism for use with a computer controlled game, which steering mechanism comprises a wheel, or the equivalent, connected to a shaft rotatably mounted in bearings, there being a flexible connection between the shaft and a fixed point, whereby when the shaft is rotated, resistance to such rotation is induced by the flexible connection and forces are generated in a direction so as to return the said wheel or its equivalent to the starting position, there being the means whereby the rotation of the wheel, or equivalent, can correspondingly affect the output of a control processing unit connected thereto, which can control an image on a video display screen.

Preferably, the flexible connection is in the form of elastomeric material which, when the shaft is rotated, stretches either longitudinally or torsionally to return the wheel to its starting position.

In one embodiment, an elastomeric tube surrounds the shaft and is connected to the shaft by one or more fixed points at one end and the other end is fixed, so rotation of the shaft causes torsion effects in the elastomeric tube. This embodiment has a realistic feel, as the further the wheel is turned the greater the resistance to further turning and the stronger the force returning it to its starting point; this action simulates the behaviour of actual vehicles.

The phrase "wheel or equivalent", includes steering wheels of the type used in any vehicle and devices such as steering bars or sections of wheels and any other construction in which steering is simulated by rotation of a shaft.

The connection to the processing unit or module which controls the image on the screen can be of any conventional type; for example there can be a potentiometer coupled to the shaft whereby rotation of the shaft controls the output of the potentiometer which is then fed to the control unit by a cable. There can also be other potentiometers or other means of sensing rotation of the shaft which control ancillary equipment for creating realism.

A feature of the device of the invention is that the steering wheel or its equivalent is caused to return to what is substantially, its starting position and which should correspond to the wheels of a vehicle in a game controlled by the device pointing straight ahead i.e. the steering wheel is self centring.

In racing cars with semi-automatic gear boxes, gear changing can be controlled by a bar or lever mounted behind the steering wheel whereby gear changing is operated by the driver's hands whilst he is steering the car. Conventionally, movement of the bar or lever on one side changes gears upwards and movement of the other side will cause a gear change downwards. Such a simulated gear change can be incorporated in the device of the present invention and we have devised an improved fixing for such a simulated gear change which can also be used for controlling acceleration and/or braking.

The fixing can comprise two switches mounted either side of the shaft and lever, which is mounted centrally about the shaft, acts on either switch. The lever is mounted with a spring washer which holds the lever apart from the switches. Either side of the lever can be depressed to operate the switch individually or both sides depressed to operate the switches together. On releasing the lever the spring washer returns the lever to its original position away from the switches. Another embodiment includes two levers centrally mounted each one of which acts on a particular switch independently. Preferably there is also an indicator mounted in the steering hub which shows that a gear-change has taken place.

A further device associated with the invention is a foot pedal unit in which there are one or more spring mounted pedals. Conveniently there is one pedal which corresponds to an accelerator and one pedal which corresponds to the brake, although further pedals can be incorporated if desired.

Preferably the pedal which corresponds to the brake simulates the action of a brake in a real vehicle by having marked increase in resistance when depressed beyond a certain point so as to correspond to the engagement of the brake pad or shoe with the disc or hub in a vehicle.

The foot pedal unit can be connected to the processing control unit by conventional means so that a vehicle controlled on a video or monitor screen by the processing control unit will respond appropriately to the foot movement of the foot pedals. Preferably the gear change mechanism and "accelerator" pedal interact so that the simulated vehicle being controlled responds appropriately, i.e. on changing down the revolutions per minute of the simulated vehicle increase.

Preferably the accelerator pedal is functionally connected to more than one output, e.g. one or more potentiometers so that movement of the pedal can affect other associated units such as sound units simulating the noise of a vehicle, fan units blowing air at the operator to simulate wind effects and a vibrating unit which can be attached to the seat on which the operator sits to simulate the vibration of a vehicle.

When the device of the invention is used with a home computer so that it is used both for its principle purpose as a home computer and also as a games playing machine the controller can be subjected to vigorous movement so it is normally clamped to a surface to provide firm support. Such firm fixing can make attachment and disconnection to the computer awkward and can lead to difficulties if the computer is used for different purposes at frequent intervals.

Associated with the device of the invention can be a board having means for detachably fixing the control processing unit whereby when a computer is placed on the board the weight of the computer acts on the board The board can be made of wood, fibre board, plastics material or any other material which is strong and rigid enough to take the weight of the computer and to have the device of the invention attached to it. Preferably the board has soft pads attached to its underside so that in use the surface on to which it is placed is protected against damage and movement of the board is restricted by adhesion between the pads and the surface. Suitable pads can be made of rubber or similar material.

The device of the invention can be detachably fixed to the board by means of nuts and bolts passing through the board and clamps or other widely used fixings. For ease of attachment thumb screws or similar fastenings can be used to avoid the need for the use of a spanner.

It is a feature of this embodiment that, in use, the weight of the computer acting on the board holds the board in place so that when, for example, a steering wheel is attached to the board, the steering wheel has a rigid support without the need to attach it to any surface or table etc.

When it is desired to restore the computer to its use as a home computer the device of the invention can be readily detached from the board and unplugged from the computer. The keyboard can then be positioned over the board and the computer and used without further adjustments.

Thus the invention can enable an operator or player to achieve a more realistic simulation of a real vehicle in a vehicle in a computer game.

The invention will now be described with reference to the accompanying drawings in which.

Figure 1:
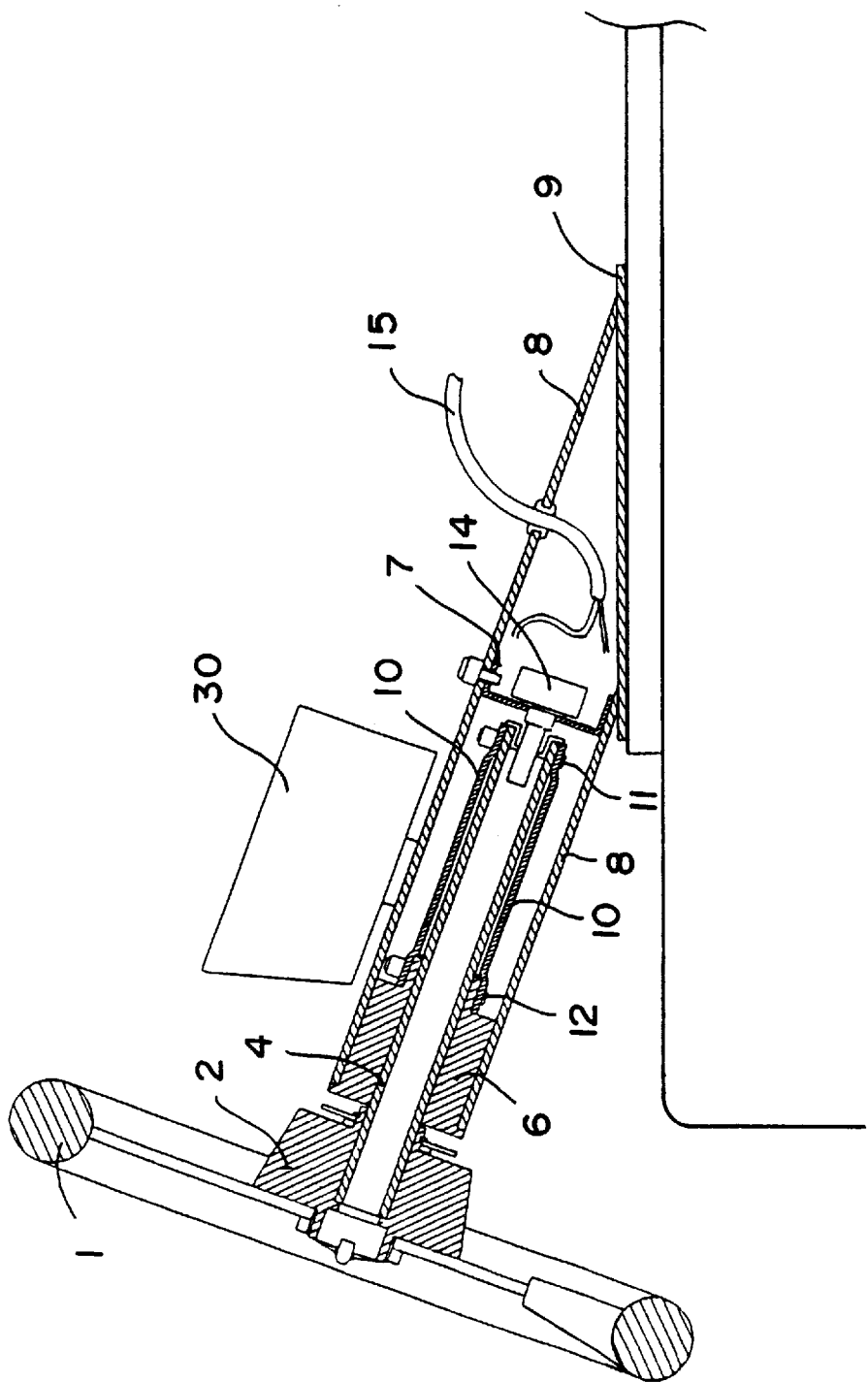
FIG. 1 is a sectioned side view of a device according to the invention.
Figure 2:
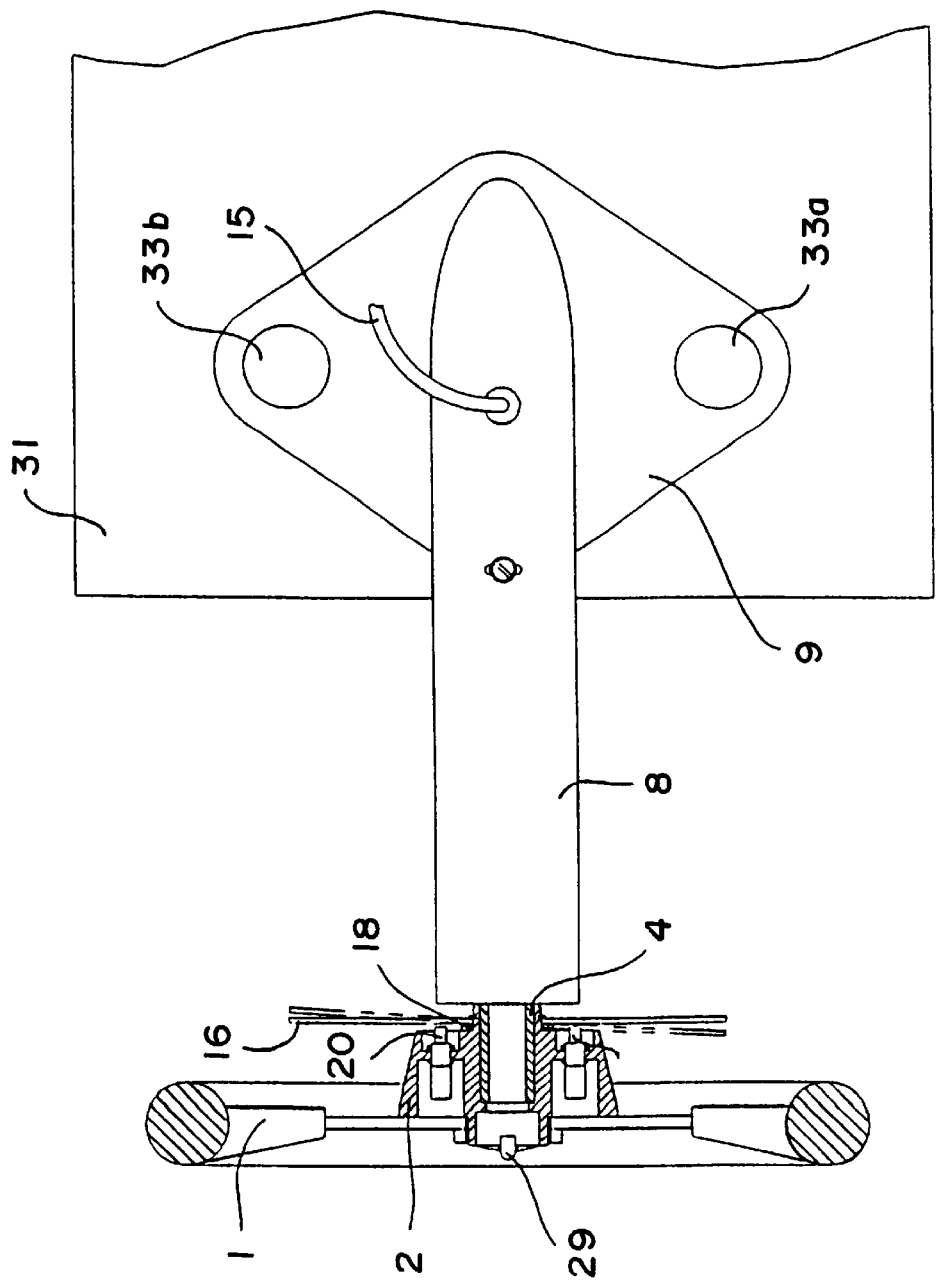
FIG. 2 is a top view of a device according to the invention.

Referring to FIGS. 1 and 2, a steering wheel (1) is mounted on hub (2) connected to a shaft (4) which can rotate in bearing (6). Bearing (6) is fixed to an outer casing (8) which is mounted on plate (9). Elastomeric tube (10) is attached to shaft (4) at (11) and bearing (6) at (12). Shaft (4) operates potentiometer (14) (FIG. 1) mounted to casing (8) by collar (7) and connected to a computer games module by cable (15). Collar (7) can be rotated axially for calibration of potentiometer (14) and clamped. There is a fan unit (30) mounted on casing (8) so that air is blown over steering wheel (1).

Referring to FIG. 2 lever (16) is centrally mounted around hub (2) and held away from switches (19) and (20) by spring washer (18). Switches (19) and (20) are connected to the computer games module. A light emitting diode LED (29) is mounted in the centre of hub (2) and electrically connected to switches (19) and (20).

In use, turning the wheel (1) causes shaft (4) to rotate in fixed bearing (6) and to set up opposing torsion in rubber tube (10) opposing this rotation. The degree of rotation is transmitted to the computer games module by means of potentiometer (14) (FIG. 1) and cable (15). When the wheel is released, it automatically returns to its rest position and so a car controlled by the steering wheel will also have its wheels returned to the straight position, thus simulating the steering action of actual cars.

When it is desired to change gear, pressure on either side of lever (16) will activate switch (19) or (20) and can thus correspondingly affect the game car. The LED (29) will indicate that a gear change has taken place. Preferably the LED (29) will show a different colour for changing 'up' or 'down' gears. This LED will also show a third colour when not in use and can indicate that the unit is switched on simulating an ignition light. The spring washer (18) automatically returns the lever to its starting position when the lever is released.

Figure 3:
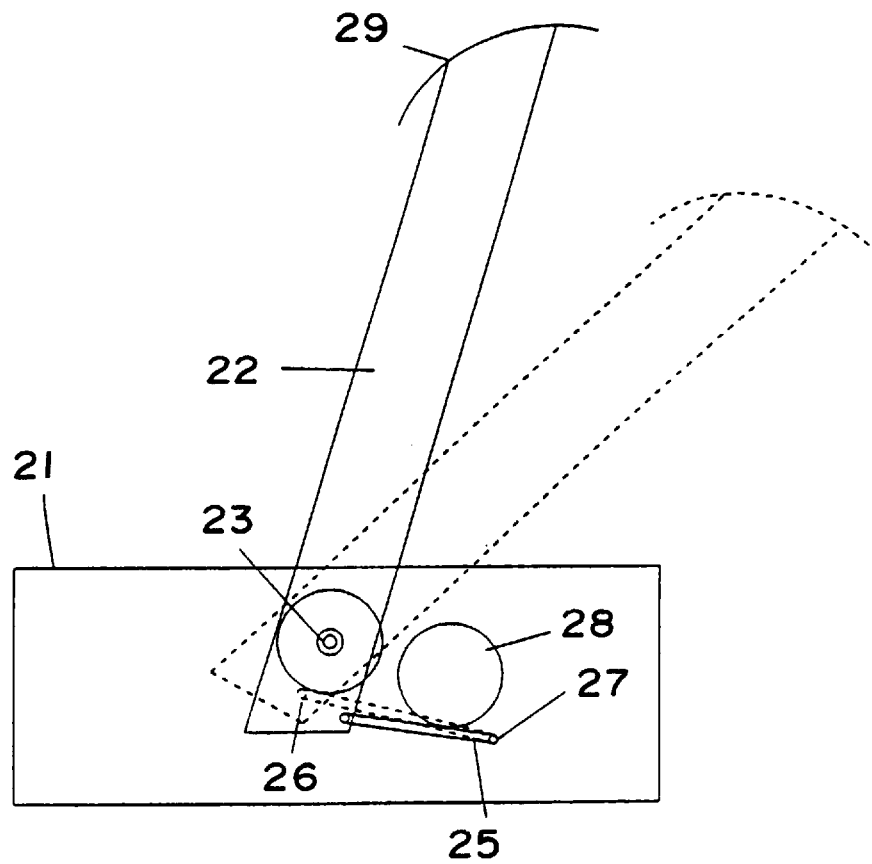
FIG. 3 is a side view of a foot control pedal for a brake.

Referring to FIG. 3, a pedal arm (22) is attached to shaft (23) which is mounted in bearings in frame (21) so that movement of the pedal arm (22) to the position shown by the dotted lines causes the shaft (23) to rotate. Mounted on shaft (23) is a potentiometer (not shown) connected to the computer or games module, rotation of the shaft (23) causes the output of potentiometer to vary and thus applying a braking effect to the simulated car. A spring (25) is attached at (26) to the bottom of pedal arm (22) and by fixing (27) to frame (21). A soft plastic buffer (28) is positioned so that movement of pedal arm (22) beyond a predetermined position starts to compress this buffer.

In use the pedal arm (22) is moved by pressure on pedal (29) which causes shaft (23) to rotate and the output of the potentiometer to increase and a simulated car in the game being played to start to brake. The spring (25) is stretched so there is resistance to the movement of pedal arm (22) and also the pedal is returned to its starting position when the pressure on the pedal is removed. When the pedal arm (22) reaches the buffer (28) the buffer is compressed and resistance to further movement of pedal arm (22) greatly increases thus simulating the action of a brake pedal in an actual car. Optionally, there can be more than one potentiometer which controls other equipment to provide realism in the braking, such as tightening of seat belts, etc.

The foot control mechanism can also have more than one pedal and particularly can have an accelerator pedal spring mounted similarly to the pedal shown in FIG. 3 and connected to the games playing module so that movement of the pedal causes the simulated car to accelerate. The accelerator pedal is preferably attached to a shaft on which there is more than one potentiometer so movement of this pedal will cause e.g. an increase in engine noise, vibration of the operators seat, the increase in air blown over the operators face by fan unit (30) etc.

Figure 4:
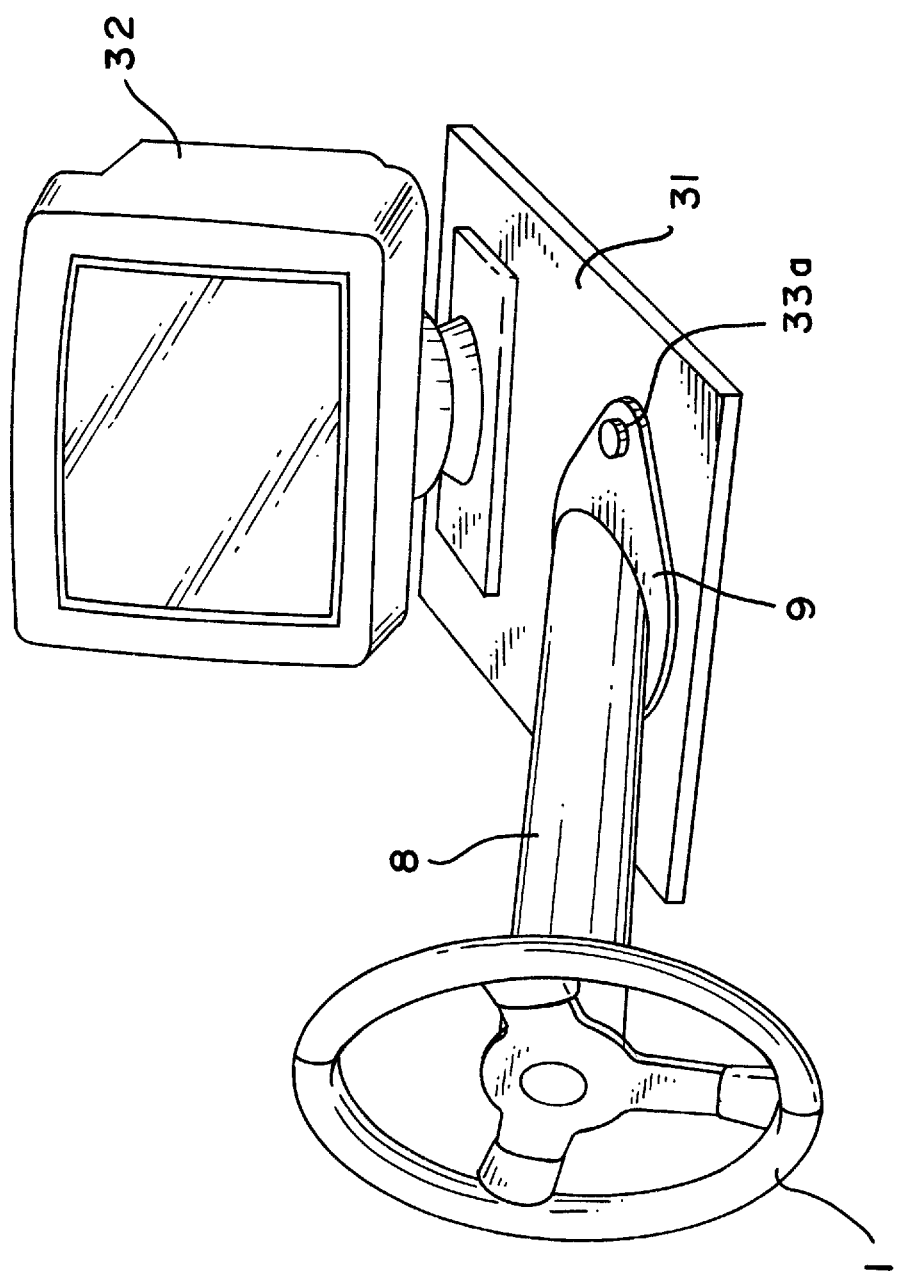
FIG. 4 is a view of the device for holding the unit on to a surface

Referring to FIG. 4, a board (31) which has rubber pads on its underside is placed on a table and computer (32) placed on it. Attached to the board (31) by means of thumbscrews (33a) and (33b) (not shown) is a metal plate (9) which has steering column (8) fixed to it. At the end of the steering column (8) is steering wheel (1) which can rotate. Attached to computer (32) is a lead (not shown) from the steering wheel.

In use, the weight of computer (32) holds the board (31) in position. The plate (9) is fixed to the board and thus the steering wheel (1) is held firmly. When it is desired to remove the steering wheel, the plate (9) is unfastened by undoing the thumbscrews (33a) and (33b) and the lead unplugged from the computer. The keyboard, etc. can then be replaced in front of the computer and it is ready for use.

Thus there is provided an easy to use means to facilitate multi-purpose use of a home computer.

We claim:

1. A control mechanism for simulating the movements of a simulated vehicle on a computer-controlled video screen comprising:

(a) steering wheel means for rotating from a neutral position and steering said simulated vehicle on said screen;

(b) said steering wheel means being rigidly connected to a rotatable steering shaft;

(c) fixed, non-rotatable means;

(d) an elongated elastomeric cylinder surrounding at least a portion of the length of said rotatable steering shaft, said elastomeric cylinder having first and second ends;

(e) said first end of said elastomeric cylinder being connected to said rotatable shaft, and said second end of said elastomeric cylinder being connected to said fixed, non-rotatable means for providing simulated resistance to the turning of said steering wheel means and for returning said wheel means to said neutral position.

2. The control mechanism of claim 1 including electrical output means, said electrical output means being connected to said rotatable steering shaft for producing an output signal indicative of the rotational position of said rotatable steering shaft.

3. The control mechanism of claim 2 wherein said electrical output means comprises at least one potentiometer.

4. The control mechanism of claim 3 including at least one gear change lever, means mounting said gear change lever adjacent said steering wheel means, and indicator means for indicating a shift of said gear change lever.

5. The control mechanism of claim 1 including a fan connected to said control mechanism for simulating the airflow in a real vehicle.

6. A control system for simulating the driving conditions of a simulated vehicle on a video screen comprising:
   (a) steering wheel means having an initial position;
   (b) means for providing realistic resistance to the turning of said steering wheel means and for returning said steering wheel means to said initial position;
   (c) gear change lever means adjacent said steering wheel means;
   (d) switch means adjacent said gear change lever means;
   (e) resilient means for maintaining said gear change lever means out of contact with said switch means; and
   (f) illumination means connected to said switch means for visually indicating when said gear change lever has effected a change of gears of said simulated vehicle.

7. The control system of claim 6 wherein said switch means comprise first and second switches mounted on opposite sides of said steering wheel means, and wherein said lever means comprise first and second gear change levers positioned adjacent said steering wheel means for individually actuating said first and second switches.

8. The control system of claim 6 wherein said resilient means comprises a spring washer surrounding said steering wheel means.

9. The control system of claim 7 further including first and second illumination means connected to said first and second switches for indicating a change of gears.

10. The control system of claim 9 wherein said illumination means comprise different color light means for indicating upward and downward shifting of said gear change lever means.

11. A control system for simulating the driving conditions of a simulated vehicle on a video screen comprising:
    (a) steering wheel means;
    (b) electrical means connecting said steering wheel means to a video screen for steering said vehicle on said screen;
    (c) foot pedal means for simulating the effect of braking said simulated vehicle;
    (d) said foot pedal means comprising a foot pedal attached to an arm;
    (e) a rotatable shaft;
    (f) said arm being connected to rotate said shaft;
    (g) spring means for resisting braking movement of said foot pedal;
    (h) said shaft being connected to electrical output means for indicating the braking effect on said simulated vehicle; and
    (i) buffer means positioned relative to said arm such that movement of said arm beyond a predetermined position produces resistance to further movement of said foot pedal and simulates a realistic braking effect.

12. The control system of claim 11 wherein said buffer means comprise compressible plastic buffer means for resisting the further movement of said foot pedal.

13. The control system of claim 11 wherein said electrical output means comprise at least one potentiometer means for indicating the magnitude of said braking effect.

14. The control system of claim 13 further including at least one other potentiometer means for producing an additional output signal upon actuation of said foot pedal.

15. The control system of claim 11 in combination with additional pedal means for simulating acceleration.

* * * * *